UNITED STATES PATENT OFFICE.

FRANCIS A. FREETH, OF GREAT CROSBY, AND HERBERT E. COCKSEDGE, OF LONDON, ENGLAND.

PROCESS OF MAKING AMMONIUM NITRATE BY THE AMMONIA-SODA PROCESS.

1,081,107.   Specification of Letters Patent.   Patented Dec. 9, 1913.

No Drawing.   Application filed June 5, 1911.   Serial No. 631,401.

*To all whom it may concern:*

Be it known that we, FRANCIS ARTHUR FREETH and HERBERT EDWIN COCKSEDGE, subjects of the King of Great Britain, residing, respectively, at Great Crosby, in the county of Lancaster, and Herne Hill, S. E., London, both in the Kingdom of England, have invented certain new and useful Improvements in Processes of Making Ammonium Nitrate by the Ammonia-Soda Process, of which the following is a specification.

There has hitherto been no industrially practicable method for the manufacture of pure ammonium nitrate from sodium nitrate by means of what is known as the ammonia-soda reaction, because the reaction as hitherto performed is too incomplete to render possible the direct separation of ammonium nitrate from the solutions in a sufficiently pure state.

We have discovered a process whereby, in the reaction of ammonium bicarbonate or of ammonia and carbon dioxid with sodium nitrate in presence of water, the proportion of sodium nitrate transformed into ammonium nitrate is so greatly increased, and the proportion of ammonium nitrate to water in the solution resulting from the reaction after separation of the sodium bicarbonate precipitated by the reaction is such, that a considerable yield of pure or practically pure ammonium nitrate in the solid form can be obtained directly by cooling the solution after a preliminary treatment for the destruction of the bicarbonates contained in it.

Our process depends upon the hitherto unrecognized fact that, in the reaction between ammonium bicarbonate (or its components, carbon dioxid and ammonia) and sodium nitrate in presence of water, the maximum possible formation of ammonium nitrate at any given temperature at which the reaction is performed is attained when the proportion of these reacting substances and of water are so adjusted that (*a*) no sodium nitrate remains undissolved when the reaction is finished. (*b*) The solution resulting from the reaction, after removing the bicarbonate of soda precipitated, is saturated at the temperature at which the reaction was performed (that is, at the temperature at which the bicarbonate of soda was removed) with respect to ammonium bicarbonate, sodium bicarbonate and ammonium nitrate. It is to be understood that in the above and on all subsequent occasions when the expressions "temperature of reaction" or "temperature at which the reaction was performed" are used, those expressions mean the temperature which obtained during the operation of removing the bicarbonate of soda precipitated by the reaction from the solution of salts resulting from the reaction. The mixture of the reacting salts and water need not necessarily be maintained at that temperature during the whole of the period preceding the removal of the precipitated bicarbonate of soda. The temperature at which the reaction is performed must not of course be above that at which the formation of a reasonable quantity of ammonium nitrate is possible; the upper practicable limit of temperature is about 35° to 40° C., but it is preferable to work at a temperature below 35° C. We have found that in order to obtain these results it is necessary to employ for the reaction a mixture of sodium nitrate, ammonium bicarbonate or its components, and water, containing a considerably larger quantity of sodium nitrate than will dissolve in the water at the temperature of reaction. For example, a solution saturated with respect to ammonium bicarbonate, sodium bicarbonate and ammonium nitrate at 25° C., and containing 186 parts of ammonium nitrate, 3.2 parts of ammonia other than that combined as ammonium nitrate, 8.4 parts of carbon dioxid, 36 parts of sodium nitrate and 100 parts of water, results from the reaction between 233.6 parts of sodium nitrate and 198.6 parts of ammonium bicarbonate in presence of 100 parts of water at 25° C., after the precipitated bicarbonate of soda has been removed at 25° C. This quantity of sodium nitrate is considerably greater than will dissolve in the water at 25° C.

We find that a solution resulting from the reaction between sodium nitrate and ammonium bicarbonate (or its components) which is saturated with respect to ammonium bicarbonate, sodium bicarbonate and ammonium nitrate at the temperature at which the reaction was performed can be cooled to a very low temperature, even to minus 25° C., without separating out the sodium nitrate which it contains. We find further that if this solution be first treated in such a way as to remove the whole or the greater part of the bicarbonates which it contains and be then subsequently cooled to a temperature below that at which the reaction was performed, crystals of ammonium nitrate are separated out which, after suitable washing to remove adherent mother liquor, are pure or practically pure.

The removal of the bicarbonates may be effected by heating the liquor either at or below atmospheric pressure for a sufficient time: if at atmospheric pressure we find that a temperature of 60° to 70° C. is suitable, whereas a temperature of 40° to 50° C. is suitable at a vacuum of 26 inches of mercury, but we do not confine ourselves to these temperatures or pressures. The removal of the bicarbonates may also be effected by neutralizing the solution with nitric acid, or by other suitable means.

The yield of solid ammonium nitrate obtained on cooling varies with the extent to which the cooling is carried.

If to the mother liquor after separation of the ammonium nitrate, equivalent quantities of ammonium bicarbonate (or its components) and sodium nitrates are added in such quantities that the amount of sodium nitrate added is equivalent to the ammonium nitrate removed by cooling (except that these quantities must be adjusted to compensate for the small amounts of ammonia, carbonic acid and water, or any of them, lost during the process of removing the bicarbonates in solution, or lost in other ways as well as for additions due to wash water) then the resultant mixture if treated in precisely the same way as before, the reaction and the cooling being both performed at the same temperatures respectively as in the previous operation, will yield precisely the same results, and the liquors resulting from the several processes will have the same composition as in the previous cycle of operations. This cycle of operations can be repeated and continued indefinitely.

It is obvious that if for any reason it is wished to vary either the temperature at which the reaction is performed or the temperature to which the liquors are subsequently cooled, or both, the composition of the reacting solution can easily be adjusted to the changed conditions, at the beginning of the next cycle.

If the cooling for separation of ammonium nitrate be carried only to that extent which suffices to separate a quantity of ammonium nitrate not greater than is equivalent to that quantity of sodium nitrate which will dissolve in the mother liquor from which the ammonium nitrate has been separated when its temperature is raised to a point not higher than that at which the reaction between ammonium bicarbonate and sodium nitrate with formation of ammonium nitrate is practicable, and if the reaction be completed at the same temperature as in the preceding cycle, then the presence of undissolved sodium nitrate in the reacting solution is avoided, while the solution remaining after the reaction is still saturated with respect to ammonium bicarbonate, ammonium nitrate and sodium bicarbonate at the temperature of the reaction. It follows therefore that an artificial mother liquor fulfilling these conditions may be prepared and employed in the original operation with which the process started, whereby the presence of undissolved sodium nitrate is avoided even in the initial operation, the reacting solution being then prepared by adding to the artificial mother liquor equivalent quantities of sodium nitrate and ammonium bicarbonate (or its components), the sodium nitrate being added in that quantity which will entirely dissolve in the liquor.

In actual practice we may so work our process that the liquor resulting from the reaction is not completely saturated with respect to ammonium bicarbonate and ammonium nitrate at the temperature of the reaction, and thereby leave a margin of safety sufficient to avoid the danger of precipitating these salts together with the bicarbonate of soda.

Our process therefore consists in causing to react together such quantities of sodium nitrate, ammonium bicarbonate (or its components) and water at any temperature at which these substances will form ammonium nitrate, as will yield when the reaction is finished and after the precipitated bicarbonate or soda resulting from the reaction has been removed at the temperature of the reaction, a solution saturated with respect to sodium bicarbonate and also saturated or nearly saturated with respect to ammonium bicarbonate and ammonium nitrate at the temperature of the reaction. The bicarbonate of soda is removed from the solution at the temperature of the reaction, by filtration or other well known means, is washed to remove adherent mother liquor, and is then pure or practically pure. The solution from which the bicarbonate of soda has been removed is then treated for the removal of the whole or the greater part of the bicarbonate in solution as previously described, and is subsequently cooled to a temperature below that at which the reaction was performed, and which may be as low as minus 25° C. if desired when crystals of ammonium nitrate separate out which are removed from the solution and washed preferably with a saturated or partially saturated solution of ammonium nitrate, and dried by any well known means. They are then pure or practically pure. To the mother liquor remaining after removal of the ammonium nitrate are added, either before, during or after heating to the temperature at which the reaction is to be performed, equivalent quantities of ammonium bicarbonate (or its components) and sodium nitrate in such quantity that the latter is equivalent in amount to the ammonium nitrate which has been removed by cooling, except that small adjustments must be made to compensate for losses during the process of removing the soluble bicarbonates, for addition of wash water, &c., the amount of which can easily be determined by simple tests. The cycle of operations is then repeated and may be continued indefinitely or until the liquors have become so impure as to require replacement.

Example: 200 parts by weight of sodium nitrate, 210 parts of ammonium bicarbonate, and 100 parts of water are stirred together at any temperature between 33° and 22° centigrade, and when the reaction is finished the precipitated bicarbonate of soda is separated from the solution at 22° centigrade. The remaining solution then contains about 40 parts of sodium nitrate, 161 parts of ammonium nitrate, and 100 parts of water, together with some ammonia other than that contained in the ammonium nitrate, and carbonic acid: when this solution is first treated as previously described in such a way as to remove the whole or the greater part of the bicarbonate which it contains, and is then subsequently cooled, it yields solid ammonium nitrate as follows, per 100 parts of water:—by cooling to —1° centigrade, about 55 parts of ammonium nitrate; by cooling to —8° centigrade, about 75 parts of ammonium nitrate; by cooling to —13° centigrade, about 85 parts of ammonium nitrate; by cooling to —22° centigrade, about 100 parts of ammonium nitrate.

We may, instead of employing in the initial cycle of our process the mixture of sodium nitrate, ammonium bicarbonate and water described above, use as the medium to which the sodium nitrate and ammonium bicarbonate are added, an artificial mother liquor made by dissolving ammonium nitrate and sodium nitrate in water in such proportions as will enable the resulting solution to dissolve entirely the required quantity of sodium nitrate, and so avoid the inconvenience of having sodium nitrate in suspension during the reaction which results in the precipitation of sodium bicarbonate.

If in our process it is desired to separate the greater part of the ammonium nitrate from the mother liquor remaining after cooling, either because the liquid has become too impure or for other reasons, we may proceed as follows:—The mother liquor is concentrated until it is nearly saturated with ammonium nitrate at 50° to 60° C.: it can then hold in solution only about 3 parts by weight of ammonium nitrate for every one part of sodium nitrate which it contains: consequently any excess of sodium nitrate above this ratio is precipitated. The precipitate is separated from the solution at 50 to 60° C. and the latter is then cooled with the addition of sufficient water to keep the sodium nitrate in solution at the temperature to which it is to be cooled. On cooling, ammonium nitrate separates out which, after separation from the solution, and suitable washing to remove adherent mother liquor, is pure or practically pure. The liquor from which the ammonium nitrate is separated may again be concentrated and precisely the same series of operations repeated, and so on as often as desired. For example, if the liquor concentrated as described, is to be cooled to minus 22° C. it must contain about 190 parts by weight of water for each 100 parts by weight of sodium nitrate, and previous to cooling, water must be added until that proportion obtains: at minus 22° C. it can only hold in solution about one part by weight of ammonium nitrate for each one part of sodium nitrate which it contains: consequently the excess of ammonium nitrate above that ratio is precipitated.

We declare that what we claim is:—

1. The process for the manufacture of commercially pure ammonium nitrate, which consists in causing to react with formation of ammonium nitrate, such quantities of sodium nitrate and a suitable reagent or reagents in presence of such quantity of water as will yield when the reaction is finished a precipitate of sodium bicarbonate and a solution saturated with respect to that salt, and also practically saturated with respect to ammonium bicarbonate and ammonium nitrate at the temperature of the reaction; removing the precipitated sodium bicarbonate from the solution at the temperature of the reaction, and washing it to remove adherent mother liquor; treating the solution from which the precipitated sodium bicarbonate has been removed in such a way as to remove practically all the remaining bicarbonate, and subsequently cooling it; separating from the cooled solution the ammonium nitrate which falls out; washing it with a substantially saturated solution of ammonium nitrate; and drying it.

2. The process for the manufacture of commercially pure ammonium nitrate, which consists in causing to react with formation of ammonium nitrate, such quantities of sodium nitrate and ammonium bicarbonate in presence of such quantity of water as will yield, when the reaction is finished, a precipitate of sodium bicarbonate and a solution saturated with respect to that salt, and also practically saturated with respect to ammonium bicarbonate and ammonium nitrate at the temperature of the reaction; removing the precipitated sodium bicarbonate from the solution at the temperature of the reaction, and washing it to remove adherent mother liquor; treating the solution from which the precipitated sodium bicarbonate has been removed, in such a way as to remove practically all the remaining bicarbonate, and subsequently cooling it; separating from the cooled solution the ammonium nitrate which falls out; washing it with a substantially saturated solution of ammonium nitrate; and drying it.

3. The improvement in the process of manufacturing commercially pure ammonium nitrate, which consists in causing to react with formation of ammonium nitrate, such quantities of sodium nitrate and a suitable reagent or reagents in the presence of such quantities of a solution containing ammonium nitrate and sodium nitrate as will yield, when the reaction is finished, a precipitate of sodium bicarbonate and a solution saturated with respect to that salt, and also practically saturated with respect to ammonium bicarbonate and ammonium nitrate at the temperature of the reaction; removing the precipitated sodium bicarbonate from the solution at the temperature of the reaction, and washing it to remove adherent mother liquor; treating the solution from which the precipitated sodium bicarbonate has been removed in such a way as to remove practically all the remaining bicarbonate, and subsequently cooling it; separating from the cooled solution the ammonium nitrate which falls out; washing it with a substantially saturated solution of ammonium nitrate; and drying it.

4. The process for the manufacture of commercially pure ammonium nitrate, which consists in stirring together 200 parts of sodium nitrate, 210 parts of ammonium bicarbonate, and 100 parts of water, at a temperature of about 22° C., separating the precipitated sodium bicarbonate at the conclusion of the reaction at the same temperature, destroying the bicarbonates in the remaining solution and cooling it to −1° C., washing the precipitated ammonium nitrate with a substantially saturated solution of the same salt, and drying it.

In witness whereof, we have hereunto signed our names this 25 day of May 1911, in the presence of two subscribing witnesses.

F. A. FREETH.
H. E. COCKSEDGE.

Witnesses:
H. WILLIAMS,
H. O. DIXON.